Oct. 9, 1928.

F. H. HEADLEY 1,687,334

PEDAL PROPELLED VEHICLE

Filed July 9, 1927  2 Sheets-Sheet 1

Inventor
Frederick H. Headley

Patented Oct. 9, 1928.

1,687,334

UNITED STATES PATENT OFFICE.

FREDERICK HAGGER HEADLEY, OF BIRMINGHAM, ENGLAND.

PEDAL-PROPELLED VEHICLE.

Application filed July 9, 1927, Serial No. 204,441, and in Great Britain January 25, 1927.

The present invention has relation to a pedal propelled vehicle, more particularly a child's vehicle such as a pedal propelled miniature motor car, the present invention having for its object to combine with a foot propelling means, a simple and efficient form of variable speed mechanism adapted for ready manipulation by the "driver" to suit the circumstances.

In order that this invention may be clearly understood and readily carried into practice, reference may be had to the appended explanatory sheets, of drawings, upon which:—

Figure 2:
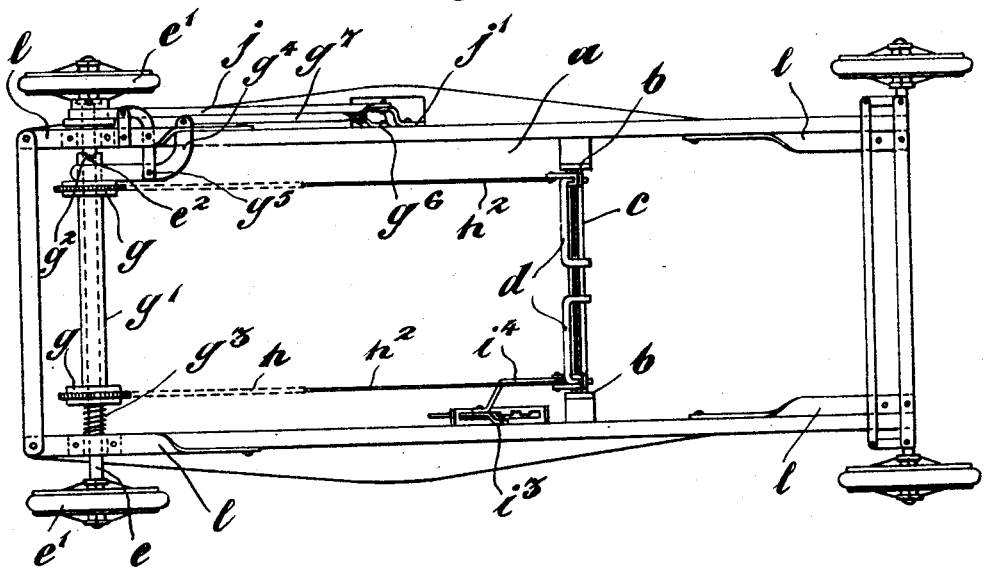
Figure 2 is an inverted plan view of the complete vehicle illustrated in Figure 1.
Figure 3:
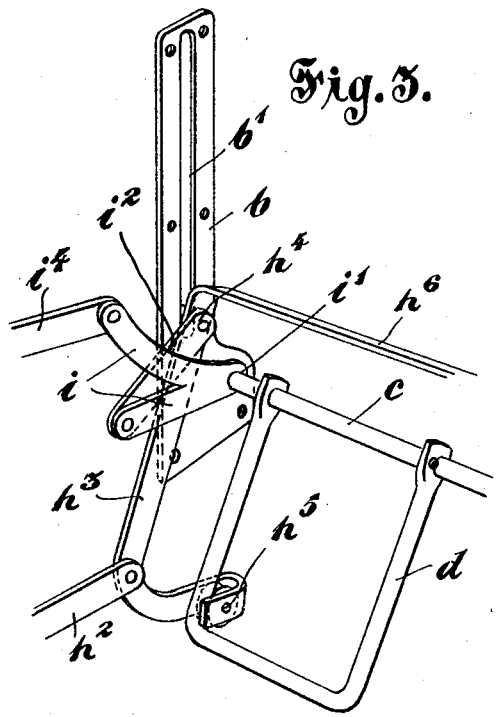
Figure 3 is an enlarged fragmentary perspective view of the variable speed mechanism shown in the preceding figures.

In a convenient embodiment of the present invention, the vehicle $a$ is provided with two elongated vertical brackets or plates $b$ one on each side of the vehicle, each bracket or plate having a vertical slot $b^1$ see more particularly Figure 3). These brackets $b$ are connected by a transverse rod $c$ whereon two independent U-shaped pedals $d$ are pivotally suspended, each being capable of oscillation by the "driver". $e$ is the wheel axle, and $g$—$g$ indicate two free wheel clutches associated therewith in the manner hereinafter more particularly described. $h$ are chains engaging the clutches $g$ and $h^1$ are return springs. Links $h^2$ connect the forward ends of the chains $h$ to links $h^3$ (see more particularly Figure 3), and the upper extremities of said links each carry a pin $h^4$ having a sliding connection with the slots $b^1$ in the brackets $b$. The lower extremities of the links slidingly co-operate, as at $h^5$, with the outermost vertical limbs of the U-shaped pedals $d$. The links $h^3$ are, however, united by an integral connecting limb $h^6$ which extends across the vehicle in parallelism with the transverse rod $c$, so that they operate in unison. $i$ is a bellcrank lever pivoted at $i^1$ upon the transverse rod $c$, and one limb of said lever is connected by a link $i^2$ to the pin $h^4$ at the uppermost extremity of the link $h^3$. The other limb of said bellcrank lever $i$ is attached to a pivotal operating handle $i^3$ by means of a connecting link $i^4$. The free wheel clutches $g$ are mounted upon a sleeve $g^1$ (see particularly Figure 2) which is slidably disposed upon the spindle proper $e$ carrying the driving wheels $e^1$. $g^2$ is a notch in the sleeve $g^1$ adapted to engage a fixed stud $e^2$ on the spindle $e$. $g^3$ is a coil spring on the spindle $e$ positioned between the springs of the vehicle $a$ and the sleeve $g^1$, which coil spring tends to force the said sleeve into notched engagement with the stud $e^2$. $g^4$ is a bellcrank lever pivoted at a point $g^5$ and adapted to be rocked by a lever $g^6$ through the medium of a link $g^7$. $j$ is a band brake operable by a lever $j^1$ adapted to co-operate with the brake drum mounted directly upon the wheel spindle.

The pedals $d$ and other respective transmissions $h$ $h^2$ $h^1$ are entirely independent one from another so far as their operation is concerned.

The wheels of the vehicle may be mounted upon forwardly and rearwardly extending pivotal radius arms $l$ supported by compression springs $l^1$.

Figure 1:
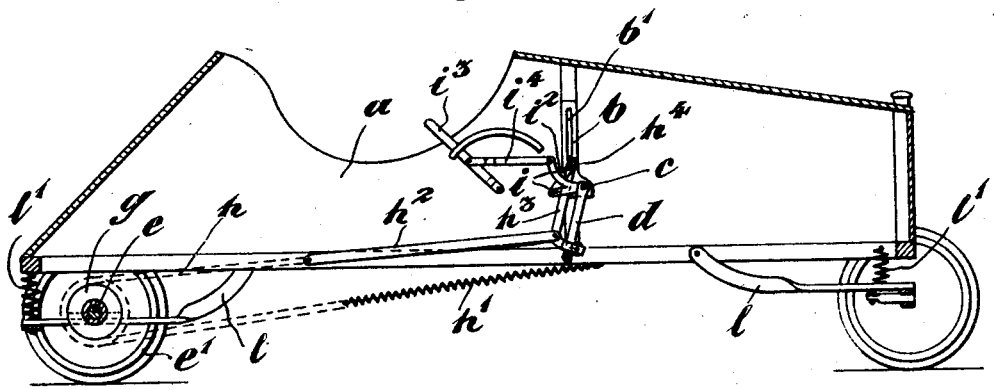
Figure 1 is a sectional elevation of a child's miniature motor car having variable speed pedal transmission mechanism constructed according to the present invention.
Figure 4:
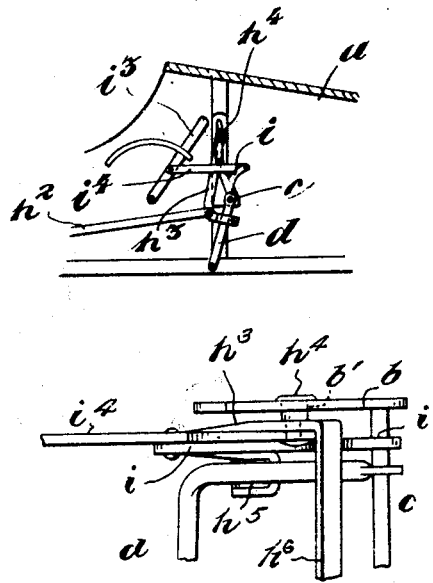
Figure 4 is an elevational view of the variable speed mechanism with parts thereof in a changed position from that illustrated in the preceding figures.
Figure 6:
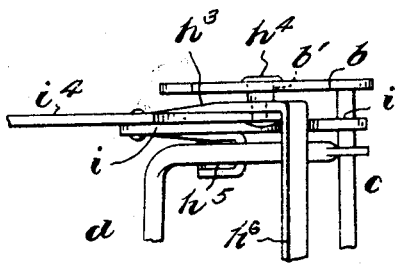
Fig. 6 is a plan view of the parts shown in Fig. 3.

In operation the pedals are alternately oscillated by the "driver", to thereby intermittently rotate the free wheel clutches and impart a forward driving movement to the axle $e$. The effective stroke or throw of the pedals $d$ is varied by manipulating the handle $i^3$, such manipulation causing the links $h^3$ to be slid along the outer limbs of the pedals $d$ in relation to their pivots. High speed is obtained as in Figure 1 when the transmission members $h^2$ are disposed remote from the pivot points of the pedals $d$, and when slid towards said pivot points, (as illustrated particularly in Figure 4) the speed is lowered, it being appreciated that the effective stroke is reduced the closer the transmissions are slid to the pivot points of the pedals, and vice versa. In order to enable the vehicle to be wheeled backwardly and also to render the transmission inoperative at any desired time, the lever $g^6$ is actuated, thereby sliding the sleeve $g^1$ and its associate free wheel clutches bodily on the shaft $e$ until the parts $g^2$ $e^2$ are disengaged. Operation of the lever $j^1$ enables the brake to be readily applied.

Figure 5:
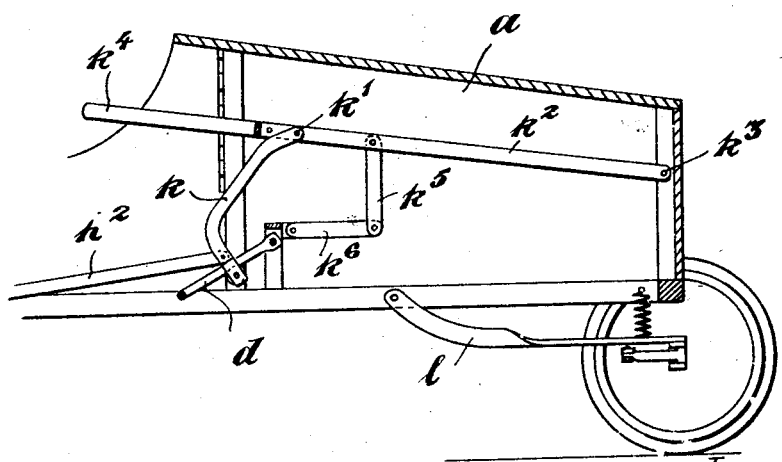
Figure 5 is a longitudinal sectional elevation of the vehicle incorporating modified variable speed gear mechanism.

In the modification of the invention illustrated in Figure 5, $d$ are the pedals, and $h^2$ are the transmission components, as in the preceding arrangement, the said components being adjustable upon the pedals $d$ by means of links $k$ pivoted at $k^1$ to a U-shaped bail $k^2$, itself pivoted at $k^3$ to the vehicle, and extended to form a handle $k^4$. Movement of the handle $k^4$ causes the link $k$ to slide the transmission components $h^2$ along the pedals $d$. $k^5$ $k^6$ is a toggle link construction adapted to steady the member $k^2$ $k^4$ and prevent any twisting thereof.

What I claim as my invention and desire to secure by Letters Patent is:—

1. A vehicle of the kind described embodying therein a rotative member, a one way clutch member thereon, a swingable pedal member pivoted at one end, a link pivoted at one end and having its other end operatively engaged with a part of said pedal member to be actuated thereby, means connecting said link and clutch member for actuating the same in one direction, and a spring arranged to move said clutch member and connecting means in the other direction, the pivoted ends of said pedal member and link being capable of a relative adjustment toward or away from each other to vary the effective throw of said link without reducing the swingable movement of the pedal member.

2. A vehicle of the kind described embodying therein a rotative member, a one way clutch member thereon, a swingable pedal member pivoted at one end, a link pivoted at one end and having its other end operatively engaged with a part of said pedal member to be actuated thereby, means connecting said link and clutch member for actuating the same in one direction, a spring arranged to move said clutch member and connecting means in the other direction, and a device to which said link is pivoted, said device being movable to vary the distance between the pivoted ends of said link and pedal member respectively.

3. A vehicle of the kind described embodying therein, a rotative member, a one way clutch member thereon, a swingable pedal member pivoted at one end, a link provided at one end and having its other end operatively engaged with a part of said pedal member to be actuated thereby, means connecting said link and clutch member for actuating the same in one direction, a spring arranged to move said clutch member and connecting means in the other direction, a plate having a slot therein, in which the pivoted end of said link is movable and means engaged with the pivoted end of said link for moving it in said slot and for holding it in the desired position therein.

4. A vehicle of the class described embodying therein a rotative member, a one way clutch member thereon, a normally pendant, swingable pedal member pivoted at one end, a link pivoted at a point above that of said member, means connecting the link and clutch member for actuating the same in one direction only, spring means arranged to move said clutch member and connecting means in the other direction, and means having pivotal connection with the pivoted ends of said pedal and link to vary the distance between the same.

5. A vehicle of the class described embodying therein a rotative member, a one way clutch member thereon, a normally pendant, swingable pedal member pivoted at one end, a link pivoted at a point above that of said pedal member, means connecting the link and clutch member for actuating the same in one direction only, spring means arranged to move said clutch member and connecting means in the other direction, a plate having a slot therein in which the pivoted end of the link is movable, an operating lever, and means connecting said lever and the pivoted end of said link for moving it in said slot.

6. A vehicle of the kind described embodying therein a rotative member, a pair of one way clutches thereon, a shaft arranged parallel with said rotative member, a pair of U shaped depending pedals, pivoted to said shaft, links each operatively engaged at one end with a part of each pedal and connected together at the other end, a plate associated with each link and having a slot therein, in which said other end of the link is pivoted, a bell crank pivoted on each end of the pedal shaft, a lever for operating one bell crank and means connecting each link with an associated bell crank.

7. In a mechanism of the kind described, a pendantly hanging, swinging pedal member, a swinging link carrying a roller at one end to engage said pedal member, and means providing a pivotal axis for the other end of said link, capable of movement toward or away from the pedal member to vary the throw of the link without changing the throw of the pedal.

8. A vehicle of the kind described embodying therein a driven shaft, a tubular sleeve thereon, means for connecting and disconnecting said shaft and sleeve, a one way clutch member on said sleeve, a normally pendant pedal pivoted at its top end, a link pivoted at one end and operatively engaged at its other end with said pedal, said first mentioned end being movable toward and away from the pivoted end of the pedal, means connecting said link and clutch member for actuating the same in one direction and a spring arranged to move said clutch member and connecting means in the other direction upon release from the driving movement of the pedal in one direction.

In witness whereof I have hereunto set my hand.

FREDERICK HAGGER HEADLEY.